United States Patent
Stephens

(10) Patent No.: US 8,167,520 B2
(45) Date of Patent: May 1, 2012

(54) SECURING DEVICE

(76) Inventor: James Matthew Stephens, Cincinnati, OH (US)

(*) Notice: Subject to any disclaimer, the term of this patent is extended or adjusted under 35 U.S.C. 154(b) by 473 days.

(21) Appl. No.: 12/220,086

(22) Filed: Jul. 22, 2008

(65) Prior Publication Data
US 2010/0019009 A1    Jan. 28, 2010

(51) Int. Cl.
*B61D 45/00* (2006.01)
(52) U.S. Cl. ..................................................... 410/119
(58) Field of Classification Search .............. 410/119; 224/539; 206/522
See application file for complete search history.

(56) References Cited

U.S. PATENT DOCUMENTS

| | | | |
|---|---|---|---|
| 2,907,580 A | 4/1955 | Teitig | |
| 2,764,950 A | 10/1956 | Finnell | |
| 3,146,460 A | 9/1964 | Henderson | |
| 3,653,710 A | 4/1972 | Barnard | |
| 3,696,449 A | 10/1972 | Smith | |
| 4,762,231 A | 8/1988 | Kiselewski | |
| 5,397,000 A | 3/1995 | Holte et al. | |
| 5,624,035 A | 4/1997 | Kim | |
| 6,004,084 A | 12/1999 | Moker | |
| 6,095,731 A | 8/2000 | Minakami et al. | |
| 6,325,412 B1 | 12/2001 | Pan | |
| 6,367,839 B1 | 4/2002 | Langhoff | |
| 6,537,003 B1 | 3/2003 | Rostoker | |
| 6,612,606 B1 | 9/2003 | Bergenheim et al. | |
| 6,769,848 B2 | 8/2004 | Rostoker | |
| 7,299,925 B1 | 11/2007 | Ansay et al. | |
| 2004/0181156 A1 | 9/2004 | Kingsford et al. | |

OTHER PUBLICATIONS

ISA, International Search Report and Written Opinion, Sep. 9, 2009, U.S.A.
ISA/USA, International Preliminary Report on Patentability and Written Opinion of the International Searching Authority, Feb. 3, 2011, The International Bureau of WIPO for Application to Experimental Holdings Inc., et al. under Application No. PCT/US2009/051260.

*Primary Examiner* — H Gutman
(74) *Attorney, Agent, or Firm* — McDonald Hopkins LLC

(57) ABSTRACT

A device is provided for securing an item comprising a body, a plurality of fingers having a first end secured to the body with the first end having an aperture, a second end, a cavity defined by the interior of the finger that is accessible from the aperture to receive a fluid therein to extend the second end from a first position outwardly from the body to a second position to secure the item, and a plurality of valve elements in fluid communication with the aperture to prevent backflow of the fluid from the cavity.

10 Claims, 6 Drawing Sheets

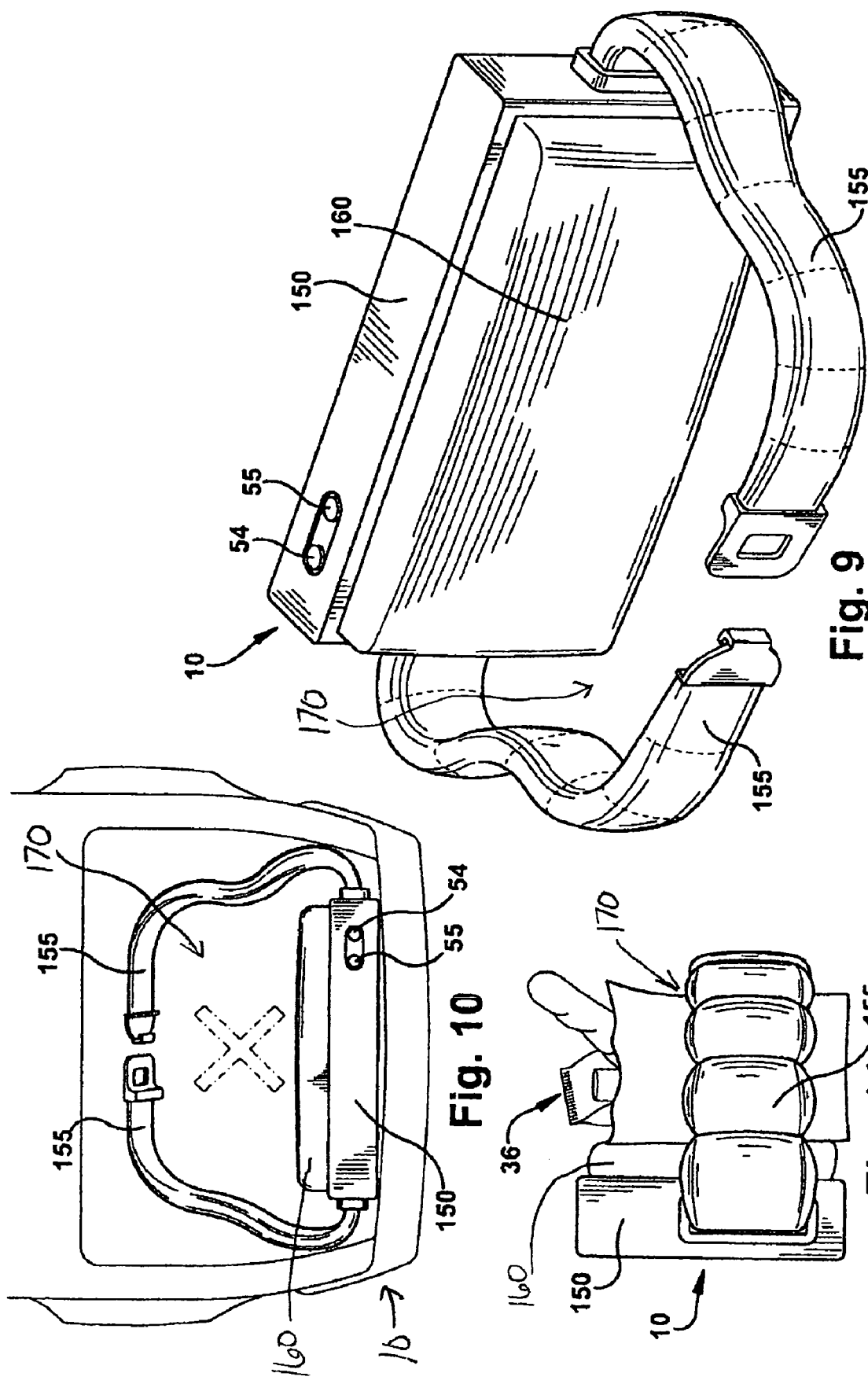

SECURING DEVICE

FIELD OF THE INVENTION

The present invention is generally related to a securing device, more particularly, to a device for securing items during transportation.

BACKGROUND OF THE INVENTION

Attempts have been made to protect items during transportation. Typically, such attempts generally include containers, straps, netting, and in some cases, inflatable bladders. Unfortunately, such techniques have proven to be unsatisfactory for a number of reasons.

For example, rigid containers lack versatility and only function properly when the item fits snugly so that there is no movement or shifting of position as the container is moved. Otherwise, the item is free to shift about within the container, which can cause damage, particularly where the item is fragile. Even when filled, a container requires careful packing to maintain the separation of items therein. Thus, it has been necessary to provide packing material to avoid shifting of the item and potential damage thereto within the container.

Netting and straps suffer from similar deficiencies, as they must be tightened around an item to secure it for transportation. However, if the items are fragile and/or have a variety of different shapes, it is difficult to secure properly. In other cases, attempts have been made to secure items with inflatable bags or bladders. However, if the bag is punctured the entire bag will deflate, leaving items unsecured and exposed to damage.

Therefore, it is desirable to provide a securing device capable of protecting various items during transportation. The present invention is directed to overcoming the above stated problems and others by providing a unique securing device.

DESCRIPTION OF THE DRAWINGS

The preferred embodiments may be better understood by reference to the following illustrations:

FIG. 9 illustrates a perspective view of the securing device in a preferred embodiment.

FIG. 10 illustrates a top view of the securing device in a preferred embodiment.

FIG. 11 illustrates a side view of the securing device in a preferred embodiment.

SUMMARY OF THE INVENTION

A device is provided for securing an item comprising a body, a plurality of fingers having a first end secured to the body with the first end having an aperture, a second end, a cavity defined by the interior of the finger that is accessible from the aperture to receive a fluid therein to extend the second end from a first position outwardly from the body to a second position to secure the item, and a plurality of valve elements in fluid communication with the aperture to prevent backflow of the fluid from the cavity.

In another aspect, a device is provided for securing an item comprising a body, a plurality of fingers comprising a first end secured to the body and having an aperture, a second end, a cavity defined by the interior of the finger accessible from the aperture to receive a fluid therein, a plurality of valve elements in fluid communication with the aperture to prevent backflow of the fluid from the cavity; and a pump in fluid communication with the cavity for providing fluid to the cavity, wherein the plurality of fingers are moveable from a storage position wherein the cavity has a first fluid pressure, to a securing position wherein the cavity has a second fluid pressure greater than the first fluid pressure so that the plurality of fingers extend outwardly from the body to secure the item.

In yet another aspect, a device is provided for securing an item comprising a body, a first arm extending from the body, and a second arm extending from the body and securable to the first arm to define a zone between the body, the first arm, and the second arm, wherein the first arm and the second arm are expandable from a first diameter to a second diameter greater than the first diameter to secure the item within the zone.

DETAILED DESCRIPTION OF THE PREFERRED EMBODIMENTS

While the invention is described herein with reference to several embodiments, it should be clear that the invention should not be limited only to the embodiments disclosed or discussed. The description of the embodiments herein is illustrative of the invention and should not limit the scope of the invention as described or claimed.

Figure 1:
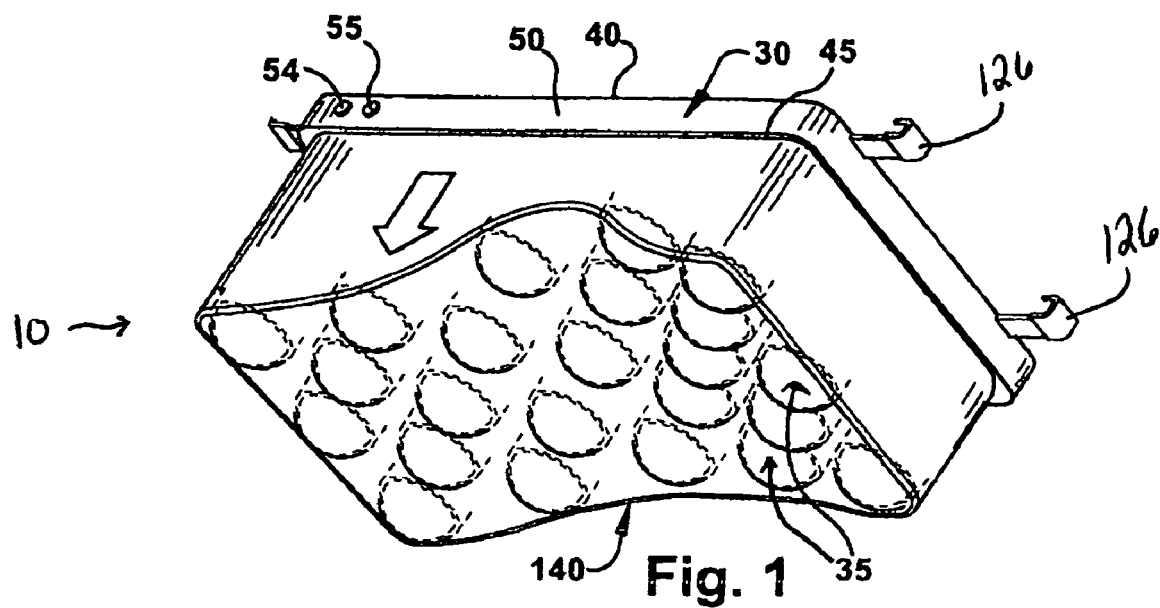
FIG. 1 illustrates a perspective view of a securing device in an extended position in a preferred embodiment.

As generally described herein, FIGS. 1-11 illustrate embodiments of a securing device 10 (hereinafter referred to as "the device 10"). As shown in FIG. 1, the device 10 may generally comprise a body 30 and a plurality of fingers 35 capable of extending from the body 30 to secure an item 36 (shown in FIG. 8). It is to be understood that the item 36 may include, but is not limited to, groceries, fragile objects, animals, and the like.

Figure 2:
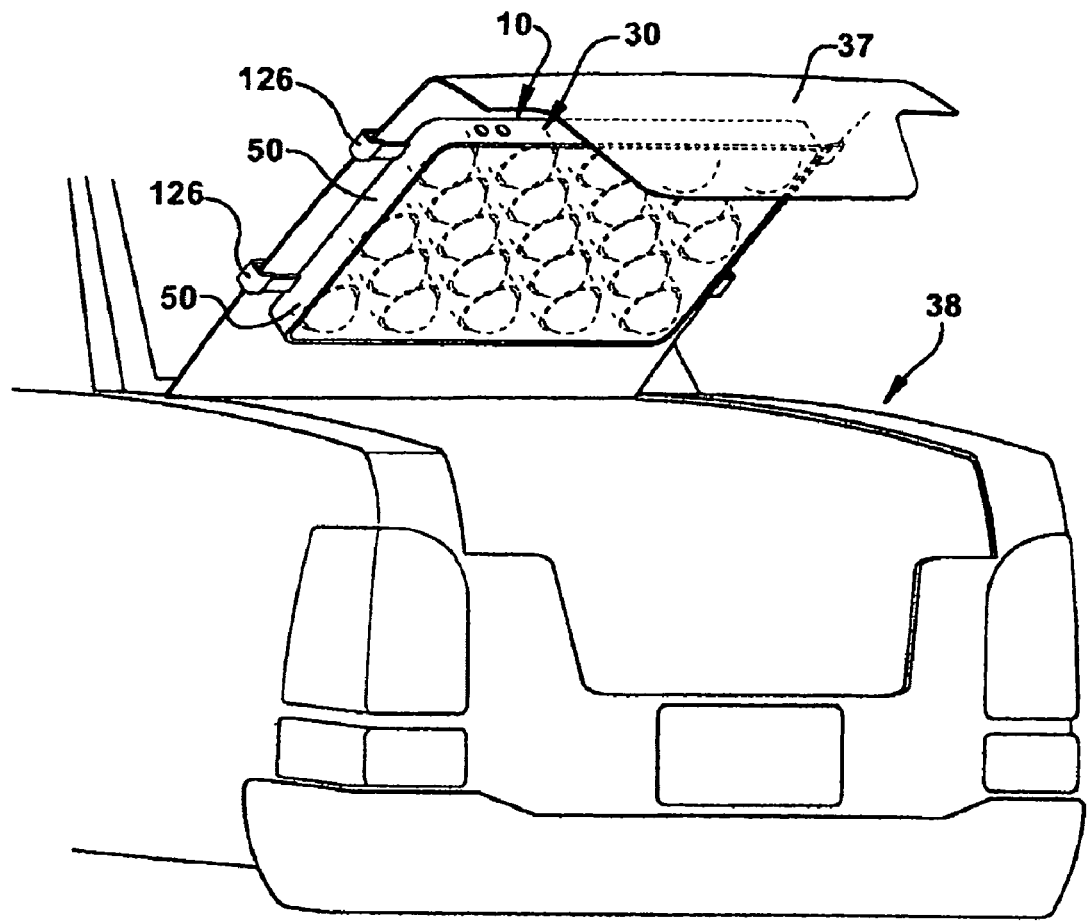
FIG. 2 illustrates a perspective view of the securing device in a storage position in a preferred embodiment.

As shown in FIG. 2, the body 30 may be substantially rectangular in shape and capable of being secured to, for example, a trunk lid 37 of a vehicle 38. The body 30 has a first side 40 (as shown in FIG. 1) for positioning along a surface and a second side 45 from which the fingers 35 extend from a first storage position (hereinafter referred to as "the first position") as shown in FIG. 3, and a second extended position (hereinafter referred to as "the second position") as shown in FIG. 2.

Figure 3:
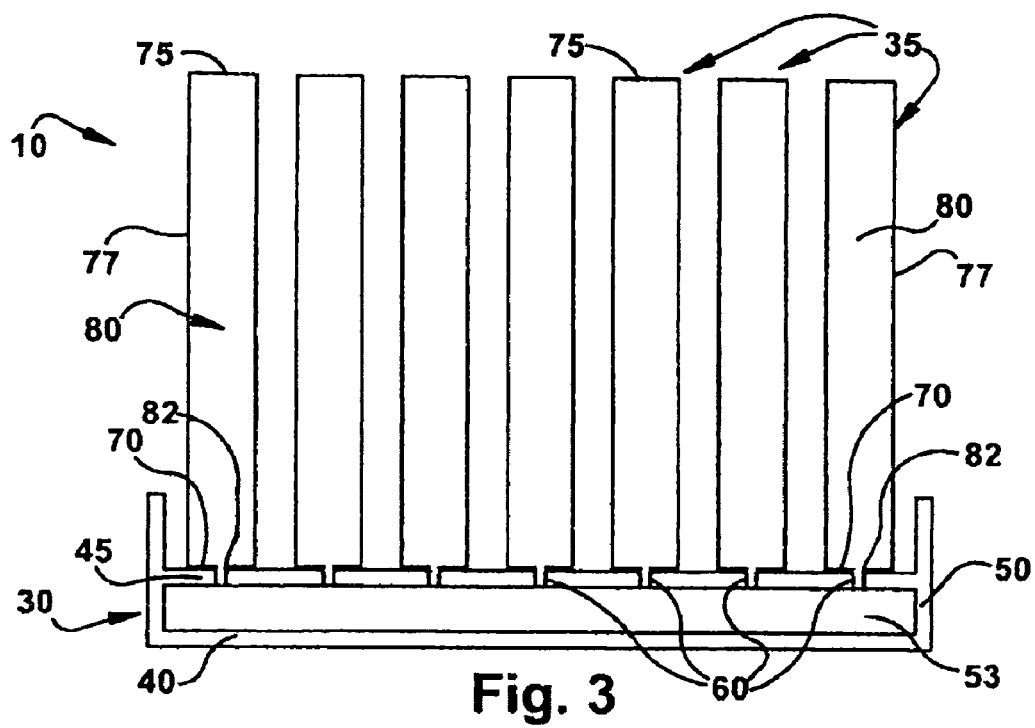
FIG. 3 illustrates a schematic view of the securing device in a preferred embodiment.

As shown in FIG. 3, sidewalls 50 may be provided to define a chamber 53 inside the body 30. It is also to be understood that the sidewalls 50 may extend beyond the second side 45 (as shown in FIG. 3) so that the fingers 35 do not extend beyond the sidewalls 50 of the body 30 in the first position (as shown in FIG. 3). Accordingly, the sidewalls 50 protect the fingers 35 while not in use. The body 30 may be constructed of any suitable material including, but not limited to metal, plastic, composites, and the like. In a non-limiting example, the body 30 (or portions thereof) may be constructed of an inflatable material, such as rubber and the like.

As shown in FIG. 3, the second side 45 may have a plurality of apertures 60 through which a fluid, such as air, may be distributed to the fingers 35. A compressor 65 (shown in FIG. 4) may be provided to supply the fluid flow (or pressure) to extend the fingers 35 to the second position. For example, the compressor 65 may be mounted on or in the body 30. In another example, the compressor 65 may be mounted in a vehicle, for example on the trunk floor and operably connected to the device 10 with a tube (not shown). In yet another example, the device 10 may utilize a compressor 65 pre-installed by a vehicle manufacturer. The compressor 65 may be, but is not limited to, a pump compressor, a hand compressor, and the like. The compressor 65 may be powered by a variety of power sources including, but not limited to, disposable batteries, rechargeable batteries, and vehicle batteries.

Figure 4:
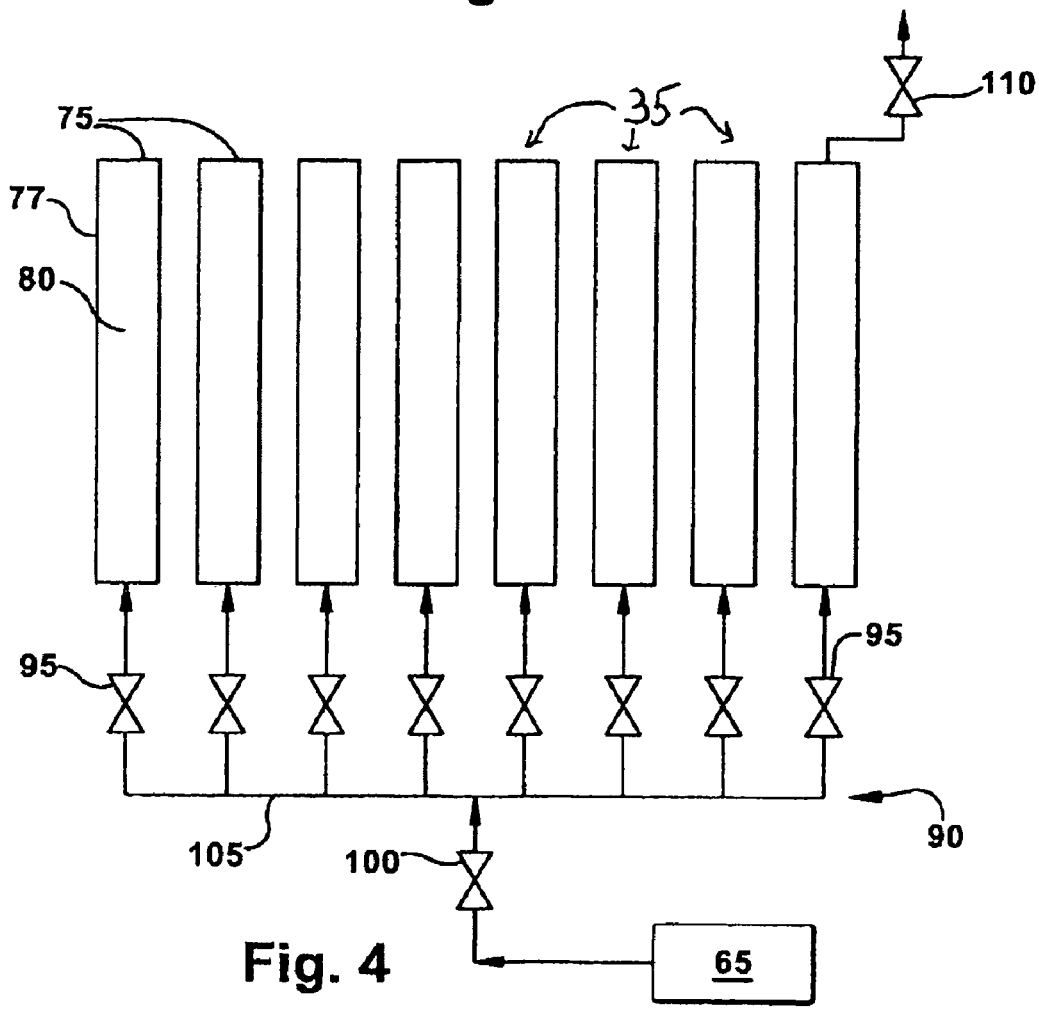
FIG. 4 illustrates a schematic view of the securing device in a preferred embodiment.

As shown in FIG. 3, the fingers 35 have a first end 70, a second end 75, and a sidewall 77 defining a cavity 80 therein. An aperture 82 is provided along the first end 70 for feeding the fluid into the cavity 80. The first end 70 may be secured to second side 45 so that the aperture 82 is substantially coaxially aligned with the aperture 60. As shown in FIG. 4, a manifold 90 may be provided to distribute the fluid to the fingers 35. When inflated, the fingers 35 extend substantially perpendicularly outward from the body 30 to the second position. The manifold 90 may be constructed from materials including, but not limited to, hoses, tubes, pipes, and the like.

One or more valve elements, such as a check valve 95 may be provided in fluid communication with the aperture 82 to prevent fluid backflow from the cavity 80. Accordingly, if one of the fingers 35 deflates, the check valves 95 will prevent backflow of the fluid from the other fingers 35 so that the other fingers 35 will not lose pressure and will remain in the second position to secure the items 36 (shown in FIG. 8). It is to be understood that the check valves 95 may be positioned anywhere between the compressor 65 and the cavity 80.

As shown in FIG. 4, a pressure-regulating valve 100 may be provided to regulate the pressure in the fingers 35. For example, the pressure regulating valve 100 may detect a pressure drop in the fingers 35 and/or a manifold feed line 105 due to a drop in temperature, leaks, punctures in the fingers 35, and the like. The pressure-regulating valve 100 may be operably connected to the compressor 65 so that, for example, upon detection of a pressure drop the compressor 65 is activated to maintain the manifold 90 pressure so that the fingers 35 remain in the second position. It is to be understood that the pressure-regulating valve 100 may be adjustable to adjust the securing force exerted on the items 36 by the fingers 35. It is also to be understood that one of ordinary skill in the art will appreciate that a variety of controls and configurations may be used to maintain the pressure in the fingers 35.

A pressure relief valve 110 may be provided on the body 30 (shown in FIG. 3), the fingers 35, the manifold 90, and any combination thereof. The pressure relief valve 110 prevents over inflation of the device 10 to prevent rupturing the fingers 35 and/or damage to the items 36. In one illustrative example, the pressure relief valve 110 may be adjustable to allow a user to adjust the amount of force exerted on the items 36 by the fingers 35.

Figure 5:
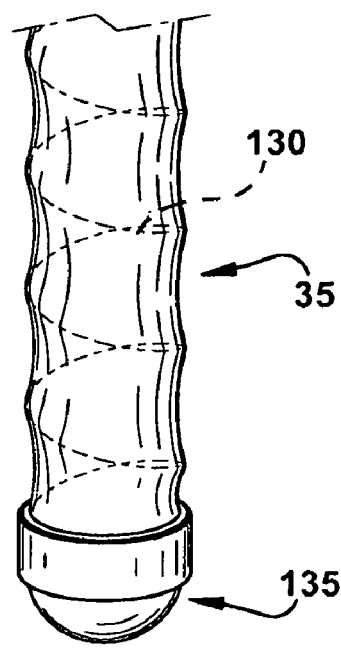
FIG. 5 illustrates a perspective view of a finger in a preferred embodiment.

The fingers 35 may be formed from a shape memory plastic or rubber so that the fingers 35 return to the first position when deflated. As shown in FIG. 5, the fingers 35 may include a coil spring 130, such as a tension coil spring, positioned therein. The coil spring 130 may be designed to resist stretching to return (or maintain) the fingers 35 to the first position when the fingers 35 are deflated. The coil springs 130 may be formed of metal, plastic, composites, or the like. The fingers 35 may also be provided with a tip 135 on the second end 75. The tip 135 may be made from a soft material, such as foam, to engage items 36 (shown in FIG. 8) when the fingers 35 are in the second position. As shown in FIG. 1, the fingers 35 may also be provided with a cover 140. The cover 140 may be mesh or mesh-like and may connect all of the fingers 35.

Figure 6:
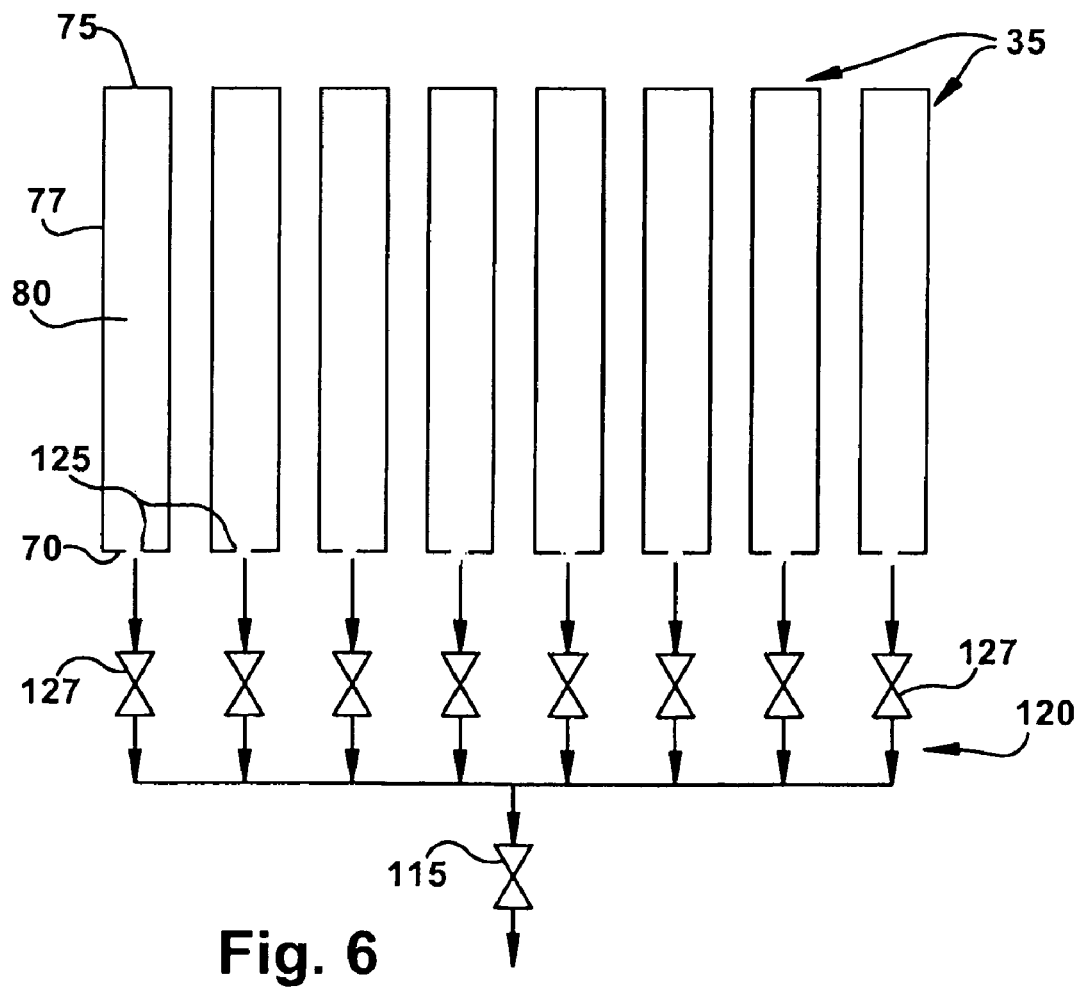
FIG. 6 illustrates a schematic view of the securing device in a preferred embodiment.

As shown in FIG. 6, a release valve 115 is provided for reducing the pressure in the fingers 35 so that the fingers 35 return to the first position. A second manifold 120 may be provided in fluid communication with the fingers 35 via an aperture 125. The second manifold 120 allows for the pressure in the cavity 80 to be released to deflate the fingers 35. The release valve 115 may be selected from, but not limited to, a needle valve, ball valve, a gate valve, a solenoid valve, pneumatic valve, and any combination thereof. Accordingly, the release valve 115 may be connected to an activator 55 (shown in FIG. 9), including but not limited to, a switch or button. When the activator 55 is activated, the release valve 115 opens and the fingers 35 retract to the first position.

Figure 7A:
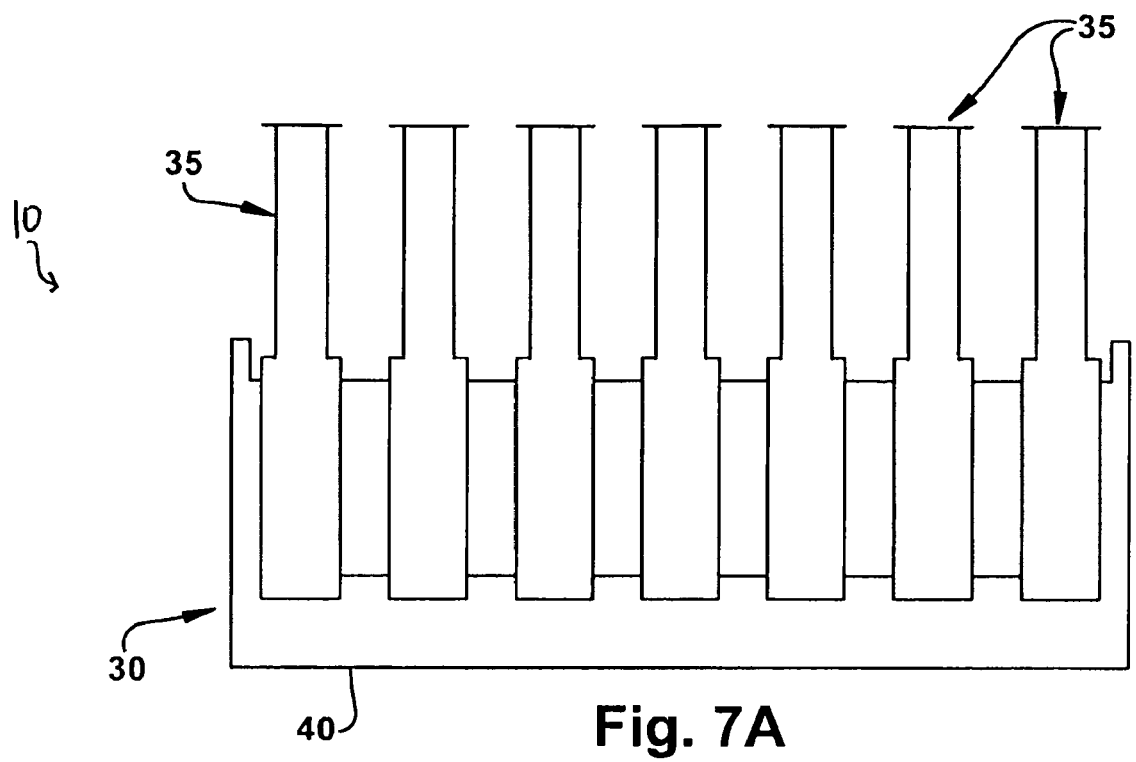
FIG. 7A illustrates a schematic view of the securing device in an extended position in a preferred embodiment.
Figure 7B:
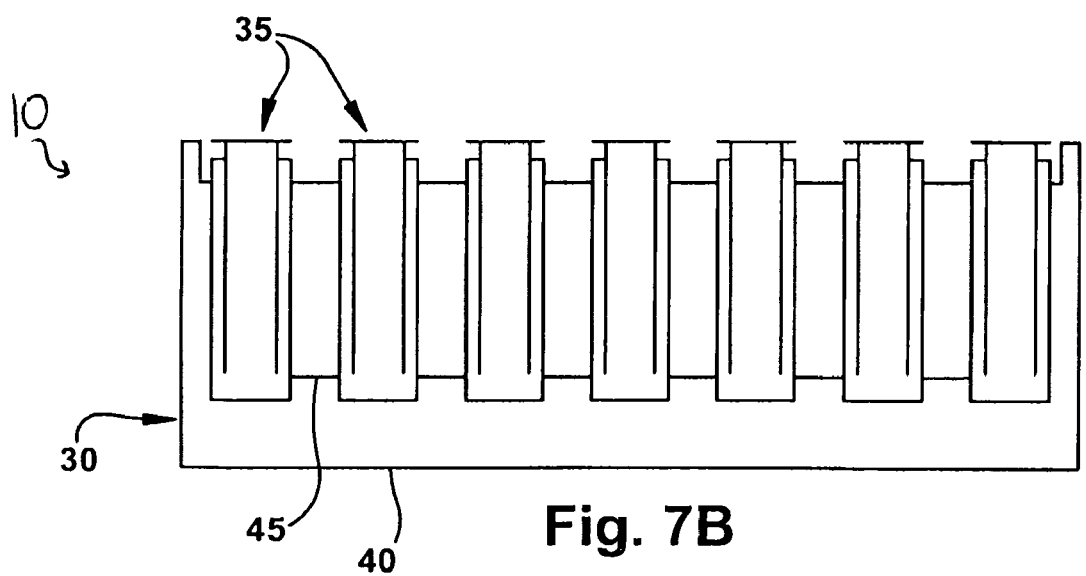
FIG. 7B illustrates a schematic view of the securing device in a storage position in a preferred embodiment.
Figure 8:
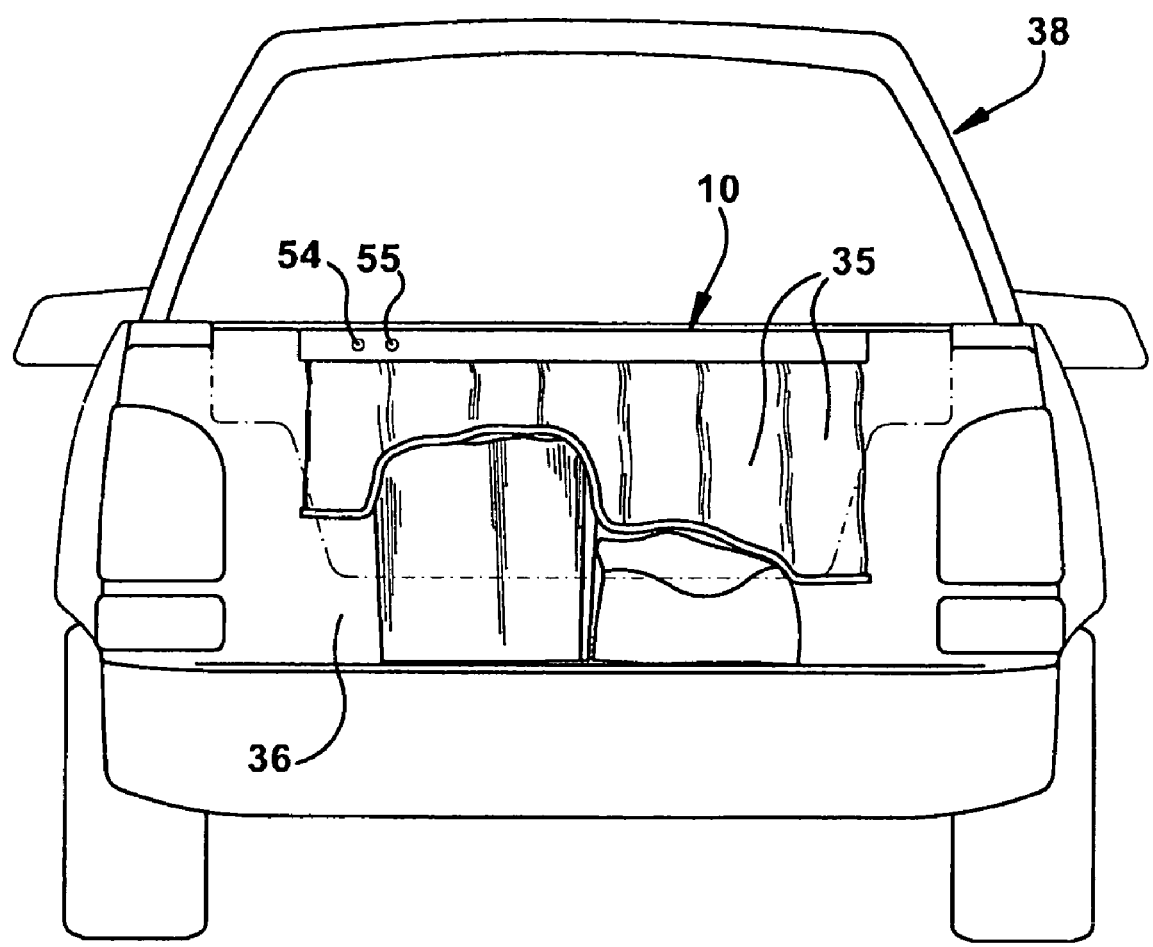
FIG. 8 illustrates a front view of the securing device in a storage position in a preferred embodiment.

In another embodiment, as shown in FIGS. 7A and 7B, the fingers 35 may be capable of telescopically extending outward from the body 30 to engage and secure one or more items 36 (as shown in FIG. 11). Accordingly, the fingers 35 may be selectively positioned between the first and second positions with a telescoping mechanism (not shown) including, but not limited to, manual mechanisms, motorized mechanisms, hydraulic mechanisms, compressed air mechanisms, and the like.

As best shown in FIG. 2, the device 10 may be provided with straps 126 capable of securing the device 10 to the vehicle trunk lid 37. The straps 126 may be adjustable so that they fit any size of trunk lid. Although shown as secured to the trunk lid 37 with straps 126, one of ordinary skill in the art will appreciate that the device 10 may be secured to the trunk lid 37 is a variety of different ways. Further, it is to be understood that the device 10 may be secured with straps 126 (shown in FIG. 9) to any part of the vehicle, not just the trunk lid 37. Illustrative examples include, but are not limited to, car doors, seats, and floor.

It is also to be understood the device 10 may be portable, or integral with a vehicle. The device 10 may be powered with any power source. The device 10 may also be used for more than just securing items 36. For example, the device 10 may be used to dampen road noise. In a non-limiting example, the device 10 may be provided in a trunk and extended to fill the empty space therein. In such an example, the fingers 35 act as a dampener to decrease the road noise during use of the vehicle.

Turning to the device 10, an example of how to use the device 10 as shown in FIGS. 1-8 is set forth below. The device 10 may be secured to a trunk lid 37. Items 36 may be positioned in the trunk beneath the device 10. The trunk lid 37 may be lowered, and a button or switch 54 may be pressed to turn on the compressor 65 to extend the fingers 35 to the second position. The fingers 35 extend and engage the items 36, thereby providing a custom fit. The construction of the fingers 35 allows the trunk lid 37 to be closed in the first securing position without damaging the items 36. It is to be understood, however, that the trunk lid 37 may be closed before the fingers 35 are extended. In a non-limiting example, the fingers 35 may be extended to engage the items 36 in the second position automatically after closing the trunk lid 37, or activated remotely from inside the vehicle.

Accordingly, the items 36 are secured during transportation. Upon arriving at the desired destination, the trunk lid 37 may be opened and activator 55 depressed to withdraw the fingers 35 to the first position.

In another embodiment, as shown in FIGS. 9-11, the device 10 may comprise a body 150 and one or more inflatable arms 155 capable of securing an item 36 therebetween. As shown in FIG. 10, the device 10 may be secured in a vehicle trunk, although it is to be understood that the device 10 may also be secured to the seat of a vehicle 38. As shown in FIG. 11, items 36 may be positioned adjacent the body 150 so that the arms 155 may be wrapped around the items 36 to secure the items 36 in a securing zone 170 (hereinafter referred to as "the zone 170") between the body 150 and the arms 155. For example, the arms 155 may be provided with connectors for removeably securing the arms 155 together about the item 36.

As shown in FIGS. 9 and 10, the arms 155 have a first diameter. As shown in FIG. 11, the arms 155 are expandable to a second diameter greater than the first diameter. This in turn decreases the size of the zone 170 to secure the items 36 therein.

For example, the arms 155 may be provided with a cavity therein, similar to the fingers 35 described above. The cavity is in fluid communication with, for example, the compressor 65 (shown in FIG. 4). The arms 155 may be made from any expandable material so that as the compressor 65 feeds fluid into the cavity of the arms 155, the arms 155 expand to the second diameter. The arms 155 may be inflated by activating the compressor 65 (as described above) and may be provided with check valves 95 (as described above).

It is to be understood that the arms 155 may be inflated either before securing the items 36, or after. As shown in FIG. 9, a portion 160 of arm 155 in contact with the items 36 may be a soft or padded material, including but not limited to, foam. It is also to be understood that the portion 160 may be inflatable or otherwise expandable. For example, the arm 155 (or portion 160) may be provided with a chamber therein capable of receiving fluid therein to extend the portion 160 from the body to a second position, as described above with respect to the fingers 35. In yet another non-limiting example, the portion 160 may include a plurality of fingers 35, as described above. In such a non-limiting example, it is to be understood that the body 150 may be operated so that only the arms 155 expand, only the portion 160 extends, or both.

The embodiments of the invention have been described above and, obviously, modifications and alternations will occur to others upon reading and understanding this specification. The claims as follows are intended to include all modifications and alterations insofar as they come within the scope of the claims or the equivalent thereof.

What is claimed is:

1. A device for securing an item comprising:
a body;
a plurality of fingers comprising:
a first end secured to said body, said first end having an aperture,
a second end,
a cavity defined by the interior of said finger accessible from said aperture to receive a fluid therein to extend said second end outwardly from the body from a first position outwardly from said body to a second position to secure said item;
a plurality of valve elements in fluid communication with said aperture to prevent backflow of said fluid from said cavity;
wherein said plurality of fingers are cylindrically shaped and include a coil spring positioned therein to extend the plurality of fingers in a direction substantially parallel to each other; and
wherein said plurality of fingers include a tip connected at an end of each finger, said tip being composed of a first material that is different than the material that forms each finger.

2. The device of claim 1 further comprising a pressure regulator for controlling the fluid pressure in said cavity.

3. The device of claim 1 wherein said body is provided with a chamber wherein said plurality of fingers does not extend outwardly beyond said body in said first position.

4. The device of claim 1 wherein said fluid is air.

5. The device of claim 1 wherein said at least one of said plurality of fingers further comprises a tip secured to said second end for engaging said item.

6. The device of claim 1 wherein said body is substantially rectangular.

7. A device for securing an item comprising:
a body;
a plurality of fingers comprising:
a first end secured to said body, said first end having an aperture,
a second end,
a cavity defined by the interior of said finger accessible from said aperture to receive a fluid therein;
a plurality of valve elements in fluid communication with said aperture to prevent backflow of said fluid from said cavity; and
a pump in fluid communication with said cavity for providing fluid to said cavity;
wherein said plurality of fingers are cylindrically shaped and include a coil spring positioned therein to extend the plurality of fingers in a direction substantially parallel to each other;
wherein said plurality of fingers include a tip connected at an end of each finger, said tip being composed of a first material that is different than the material that forms each finger; and
wherein said plurality of fingers are moveable from a first position wherein said cavity has a first fluid pressure, to a second position wherein said cavity has a second fluid pressure greater than said first fluid pressure so that said plurality of fingers extend outwardly from said body to secure said item.

8. The device of claim 7 wherein said body has a chamber defined by the interior of said body.

9. The device of claim 8 wherein said pump is located within said chamber.

10. The device of claim 8 wherein said chamber is in fluid communication with said cavity.

* * * * *